Patented Feb. 10, 1931

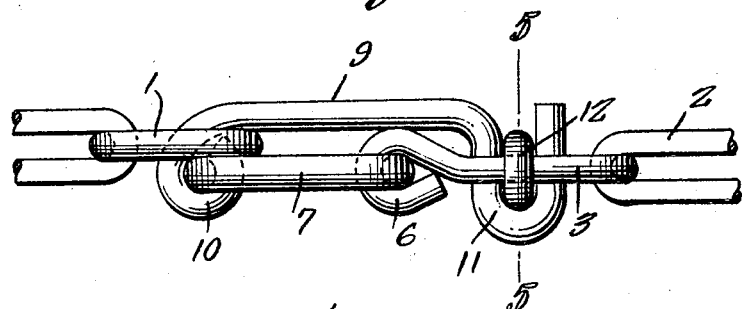
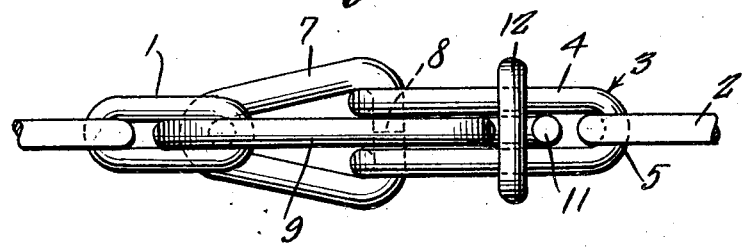
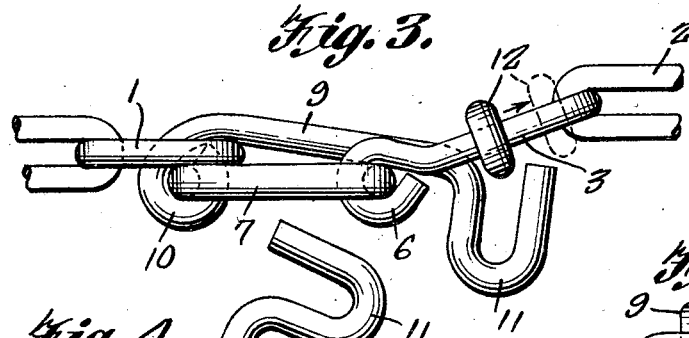
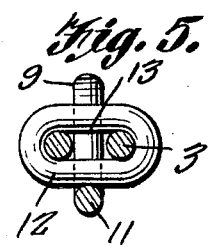
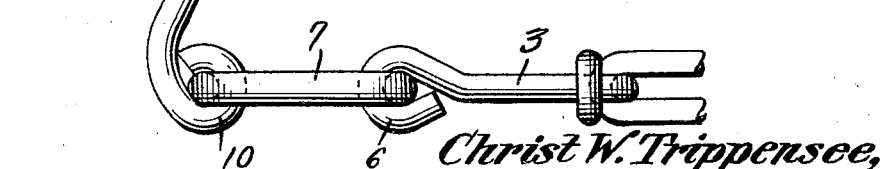

1,792,336

UNITED STATES PATENT OFFICE

CHRIST W. TRIPPENSEE, OF JEFFERSON CITY, MISSOURI

CHAIN FASTENER

Application filed April 26, 1930. Serial No. 447,675.

This invention relates to improvements in tire chains and more particularly to chains of the type the ends of which are to be connected when the chain is applied about a tire casing, and while the invention is designed primarily for use in connection with tire chains, it may be employed in connection with any other chain structure, such for example, as emergency chains, load binding chains and logging chains, and the primary object of the present invention is to provide a novel form and arrangement of link elements constituting the connection and one of which is adapted to exert leverage when engaged with one of the terminal links of the chain and thus draw the chain tightly about the tire surface.

The invention also has as its object to provide a device for the purpose stated which will be extremely simple in construction and inexpensive to manufacture and one which can be instantly disarranged so as to permit of separation of the ends of the chain connected thereby.

This invention also consists in certain other features of construction and in the combination and arrangement of the several parts, to be hereinafter fully described, illustrated in the accompanying drawing, and specifically pointed out in the appended claims, it being understood of course that minor changes may be made so long as they fall within the scope of the claims.

In describing my invention in detail, reference will be had to the accompanying drawing, wherein like characters denote like or corresponding parts throughout the several views, and in which:—

Figure 1 is a view in side elevation of the device embodying the invention with the parts in position to connect the ends of a chain.

Figure 2 is a top plan view of the device.

Figure 3 is a view similar to Figure 1 and illustrating the device and one chain end to which one member of the device is connected, partly displaced for the purpose of separating the chain ends.

Figure 4 is a similar view illustrating the parts nearly separated.

Figure 5 is a detail sectional view on the line 5—5 of Figure 1.

In the drawing the numerals 1 and 2 indicate terminal links of a chain which are to be connected by the device embodying the invention and the device includes a link member 3 which comprises side members 4 and a connecting bend 5, the said side members being bent at their ends opposite the bend 5, to provide eyes 6. This member is engaged with the link 2 of the chain and there is engaged in the eyes 6 of the member 3, a link which is indicated in general by the numeral 7 and this link is of substantially triangular form, and the connecting portion of the link, indicated by the numeral 8, is engaged snugly in the eyes 6. The device further comprises a lever member indicated in general by the numeral 9, and this member comprises a shank which is overturned at one end to form an eye 10 which engages the link 7 at its apex or other end, the lever being adapted to be swung about the said apex of the link 7 as is best shown in Figure 4 of the drawing. At its free end, the lever member 9 is bent to provide a substantially U-shaped hook 11, and by reference to Figures 1 and 2 of the drawing, it will be observed that the member 9 is to have its hooked end 11 inserted through the link 1, when the ends of the chain are to be brought together and locked in their connected relation, and in engaging the member 9 through the link 1, the member 9 is swung about the apex of the link 7 so that the link 7 will engage beneath one end of the link 1 and the member 9 will engage, adjacent its eye 10, against the upper side of this link, and, when the lever has been swung to assume the position shown in Figures 1 and 2, its shank will engage between the upper sides of the eyes 6 of the link member 3 and its hooked end 11 will likewise be engaged between the side members 4 of the said link 3.

In order to hold the lever member 9 in this position and prevent its outward swinging, which would result in a separation of the member from the link 1, a locking member 12 is employed and this member comprises an elongate link-like body which is slidably fitted onto the link member 3 and, due to the peculiar formation of the member 12, it will, in effect, have a slot 13 through which the portions 4 of the link member 3 extend and the rounded ends of this slot will embrace the outer sides of the said members 4 so that, the member 12 having been positioned as shown in full lines in Figure 3 of the drawing, as also the link member 3, the link member 3 may be swung downwardly and the member 9 upwardly so that the hooked end 11 of the member 9 will engage the opposite sides and likewise the lower sides of the locking member 12. As the tire chain, equipped with the invention, will be applied to a tire with the bend forming the hook 11 of the member 9 presented to the tread surface of the tire casing, it will be evident that the said member 9 will be firmly and securely held in the position shown in Figures 1 and 2, and in this manner the links 1 and 2 of the chain are securely connected and their accidental separation cannot take place.

What I claim is:—

1. A device for connecting the end links of a tire chain comprising a link having a bend at one end for engagement with one of the end links of the chain, a link pivotally connected at one end with the other end of the first mentioned link, a lever member pivotally connected at one end with the other end of the last mentioned link and engageable through the other end link of the chain and having a hooked end to engage in the first mentioned link, and a locking element slidably mounted upon the first mentioned link and engageable by the hooked end of the said lever member.

2. A device for connecting the end links of a tire chain comprising a link having a bend for engagement with one of the end links of the chain, a triangular link pivotally connected with the first mentioned link, a lever member pivotally connected with the apex of the last mentioned link and engageable through the other end link of the chain and having a hooked end to engage in the first mentioned link, and a locking element slidably mounted upon the first mentioned link and engageable by the hooked end of the said lever member.

In testimony whereof I affix my signature.

CHRIST W. TRIPPENSEE.